(12) United States Patent
Emmons et al.

(10) Patent No.: US 10,287,986 B2
(45) Date of Patent: May 14, 2019

(54) GAS TURBINE ENGINE FUEL SYSTEM PROGNOSTIC ALGORITHM

(71) Applicant: United Technologies Corporation, Farmington, CT (US)

(72) Inventors: Floyd Richard Emmons, West Hartford, CT (US); David A. Salminen, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 440 days.

(21) Appl. No.: 15/223,305

(22) Filed: Jul. 29, 2016

(65) Prior Publication Data

US 2018/0030898 A1 Feb. 1, 2018

(51) Int. Cl.
| F02C 7/22 | (2006.01) |
| G01M 15/14 | (2006.01) |
| G05B 23/02 | (2006.01) |

(52) U.S. Cl.
CPC .............. *F02C 7/22* (2013.01); *G01M 15/14* (2013.01); *G05B 23/0283* (2013.01); *F05D 2260/80* (2013.01); *F05D 2260/82* (2013.01); *F05D 2260/821* (2013.01)

(58) Field of Classification Search
CPC ...... F02C 7/22; G01M 15/14; F05D 2260/821
See application file for complete search history.

(56) References Cited

U.S. PATENT DOCUMENTS

| 2004/0034456 | A1 | 2/2004 | Felke | |
| 2004/0148088 | A1* | 7/2004 | Davis | G07C 5/008 |
| | | | | 701/123 |
| 2017/0057667 | A1* | 3/2017 | Ward | F04B 49/065 |

FOREIGN PATENT DOCUMENTS

| EP | 2549415 A1 | 1/2013 |
| EP | 2837799 A1 | 2/2015 |
| GB | 2492230 A | 12/2012 |
| WO | 9420739 A2 | 9/1994 |

OTHER PUBLICATIONS

European Search Report for EP Application No. 17182406.3; dated Dec. 14, 2017; 7 pages.

* cited by examiner

*Primary Examiner* — Manuel L Barbee
(74) *Attorney, Agent, or Firm* — Cantor Colburn LLP (57) ABSTRACT

A system and method of calculating a fuel pump life expectancy in a fuel burning engine is provided. The method includes tracking a fuel pump speed of the fuel burning engine, tracking a position value of at least one fuel actuated actuator in the fuel burning engine, and calculating a fuel pump life expectancy value based on the fuel pump speed and the position value of the at least one fuel actuated actuator.

18 Claims, 4 Drawing Sheets

GAS TURBINE ENGINE FUEL SYSTEM PROGNOSTIC ALGORITHM

BACKGROUND

In an aircraft gas turbine engine fuel supply system it is common to use a positive displacement pump such as a gear pump or a piston pump to provide fuel at a high pressure through a fuel metering unit (FMU), to the burners of the gas turbine engine. Positive displacement pumps all have an individual internal leakage characteristic in that some proportion of the high pressure output flow of the pump leaks back to the low pressure inlet side of the pump by way of internal leakage flow paths in the pump.

Such leakage can become progressively worse with time as a result of wear of the internal components of the pump. Further, pumps will wear at different rates dependent upon their usage and the ambient conditions in which they operate. Therefore, eventually a point is reached in the service life of every pump at which the leakage is sufficient to prevent the pump from being able to deliver either the flow required to start the associated engine at low engine/pump speeds, or provide the flow required for aircraft take-off at maximum engine/pump speed. Further, the engine fuel pump is often integral with the fuel control so in those situations there is no practical way to assess the performance of the fuel pump by, for example, measuring actual pump fuel flow. Accordingly, currently fuel pumps are replaced on a set schedule that is based on a worst case scenario so it is often the case that fuel pumps are replaced that still have remaining useful life.

Accordingly, it is desirable to provide a prognostic algorithm for predicting when a fuel pump maintenance action will be required.

BRIEF DESCRIPTION

According to one embodiment, a method of calculating a fuel pump life expectancy in a fuel burning engine is provided. The method includes tracking a fuel pump speed of the fuel burning engine, tracking a position value of at least one fuel actuated actuator in the fuel burning engine, and calculating a fuel pump life expectancy value based on the fuel pump speed and the position value of the at least one fuel actuated actuator.

In addition to one or more of the features described above, or as an alternative, further embodiments may include, wherein the fuel actuated actuator is a stator vane.

In addition to one or more of the features described above, or as an alternative, further embodiments may include, wherein tracking the position value includes tracking a stator vane opening percentage.

In addition to one or more of the features described above, or as an alternative, further embodiments may include, wherein calculating the fuel pump life expectancy includes determining a stator position point when the position value of the stator vane reaches a stator vane threshold position value during a fuel burning engine starting cycle.

In addition to one or more of the features described above, or as an alternative, further embodiments may include, wherein calculating the fuel pump life expectancy includes detecting when the fuel pump speed reaches a speed threshold value.

In addition to one or more of the features described above, or as an alternative, further embodiments may include replacing the fuel pump when the calculated life expectancy value of the fuel pump exceeds a life expectancy threshold.

In addition to one or more of the features described above, or as an alternative, further embodiments may include tracking temperature values at different points and in different components of the system, and adjusting the calculating of the fuel pump life expectancy value based on the tracked temperature values.

In addition to one or more of the features described above, or as an alternative, further embodiments may include incorporating a time-history prognosticating algorithm to trend the fuel pump speed and position value of the at least one fuel actuated actuator over time, and adjusting the calculating of the fuel pump life expectancy value based on the time-history prognosticating algorithm to determine a fuel pump replacement.

In addition to one or more of the features described above, or as an alternative, further embodiments may include, wherein tracking one or more of the following are inversely related to the fuel pump life expectancy an increase in time it takes the fuel actuated actuator to reach an open position, an increase in time it takes for the fuel pump speed to reach a threshold, and an increase in time when the fuel starts flowing.

In addition to one or more of the features described above, or as an alternative, further embodiments may include compensating for fuel actuated actuator degradation by incorporating an algorithm to evaluate the performance of the fuel actuated actuator.

According to another embodiment, a computer program product for calculating a fuel pump life expectancy in a fuel burning engine is provided. The computer program product including a computer readable storage medium having program instructions embodied therewith. The program instructions executable by a processor to cause the processor to track a fuel pump speed of the fuel burning engine, track a position value of at least one fuel actuated actuator in the fuel burning engine, and calculate a fuel pump life expectancy value based on the fuel pump speed and the position value of the at least one fuel actuated actuator.

In addition to one or more of the features described above, or as an alternative, further embodiments may include, having additional program instructions embodied therewith, the additional program instructions executable by a processor to cause the processor to track a stator vane opening percentage, wherein the fuel actuated actuator is the stator vane.

In addition to one or more of the features described above, or as an alternative, further embodiments may include, having additional program instructions embodied therewith, the additional program instructions executable by a processor to cause the processor to determine a stator position point when the position value of a stator vane reaches a stator vane threshold position value during a fuel burning engine starting cycle, wherein the fuel actuated actuator is the stator vane, and detect when the fuel pump speed reaches a speed threshold value.

In addition to one or more of the features described above, or as an alternative, further embodiments may include, having additional program instructions embodied therewith, the additional program instructions executable by a processor to cause the processor to replace the fuel pump when the calculated life expectancy value of the fuel pump exceeds a life expectancy threshold.

In addition to one or more of the features described above, or as an alternative, further embodiments may include, having additional program instructions embodied therewith, the additional program instructions executable by a processor to cause the processor to track temperature values at different points and in different components of the system, and adjust the calculating of the fuel pump life expectancy value based on the tracked temperature values.

In addition to one or more of the features described above, or as an alternative, further embodiments may include, having additional program instructions embodied therewith, the additional program instructions executable by a processor to cause the processor to incorporate a time-history prognosticating algorithm to trend the fuel pump speed and position value of the at least one fuel actuated actuator over time, and adjust the calculating of the fuel pump life expectancy value based on the time-history prognosticating algorithm to determine when a fuel pump replacement is required.

In addition to one or more of the features described above, or as an alternative, further embodiments may include, wherein tracking one or more of the following are inversely related to the fuel pump life expectancy an increase in time it takes the fuel actuated actuator to reach an open position, an increase in time it takes for the fuel pump speed to reach a threshold, and an increase in time when the fuel starts flowing.

According to another embodiment, a system for determining a fuel pump life expectancy is provided. The system includes a fuel actuated actuator, wherein a fuel pump speed of the fuel burning engine is tracked and a position value of the fuel actuated actuator is tracked, a fuel pump configured to provide fuel to the fuel burning engine, and a controller configured to receive the fuel pump speed and the position value of the fuel actuated actuator and configured to calculate a fuel pump life expectancy value based on the fuel pump speed and the position value of the at least one fuel actuated actuator.

In addition to one or more of the features described above, or as an alternative, further embodiments may include, wherein the fuel actuated actuator is a stator vane, and wherein tracking the position value includes tracking a stator vane opening percentage.

In addition to one or more of the features described above, or as an alternative, further embodiments may include a time-history prognosticating algorithm configured to trend the fuel pump speed and position value of the at least one fuel actuated actuator over time, wherein calculating the fuel pump life expectancy value is adjusting based on the time-history prognosticating algorithm to determine a fuel pump replacement.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

As shown and described herein, various features of the disclosure will be presented. Various embodiments may have the same or similar features and thus the same or similar features may be labeled with the same reference numeral, but preceded by a different first number indicating the Figure Number to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

One or more embodiments described herein are directed to monitoring a number of different data values collected from the engine system that can be used to predict the useful life left on the fuel pump. Particularly, because the rate at which a pump wears is dependent upon its operational parameters it is desirable to be able to monitor the health of the pump in use, that is to say to monitor its leakage characteristic, during service, in order to allow pumps to be taken out of service at the optimum time in relation to the life of the pump rather than at fixed maintenance intervals. Thus, in accordance with one or more embodiments, a pump could be replaced when its monitored health indicates that a failure may be imminent rather than replacing the pump at a fixed and pre-determined time. Naturally pumps which are exhibiting less wear can remain in service longer.

According to one or more embodiments, it will be recognized that, ignoring leakage in the pump, the output flow of a positive displacement pump is proportional to its rotation speed. Generally, positive displacement pumps in aircraft engine fuel supply systems are driven from an engine accessory gear box so that the pump speed is directly proportional to the speed of the associated engine.

Accordingly, one or more embodiments illustrate a concept for an algorithm to evaluate fuel pump performance by correlating the pump speed and the fuel actuated effectors such as actuator position(s) required for admitting fuel flow for engine start. Specifically, during the start cycle the metering valve will not admit fuel burn flow until all fuel actuated effectors have reached the commanded start position. Therefore, one or more embodiments establish a baseline point in a starter fuel pump speed where the fuel actuated effectors, such as a stator vane, reaches its required position for admitting fuel flow for a new pump. With subsequent operating data a trend is established for this operating point. As the pump wears, the operating point will shift to a higher starter fuel pump speed, thus a limit can be established indicating when the pump has reached its useful life.

In accordance with one or more embodiments, the fuel pump speed where the stator vane reaches its commanded position falls in a narrow fuel pump speed band. In contrast, according to one or more other embodiments it can be appreciated that the stator vane starts to move to the start position at a low fuel pump speed. Further, it can be appreciated that the range can vary widely and will change over time. Particularly, the range can changed based on when the fuel pump wears and on other factors that can affect the range such as temperature and wear of other components.

Figure 1:
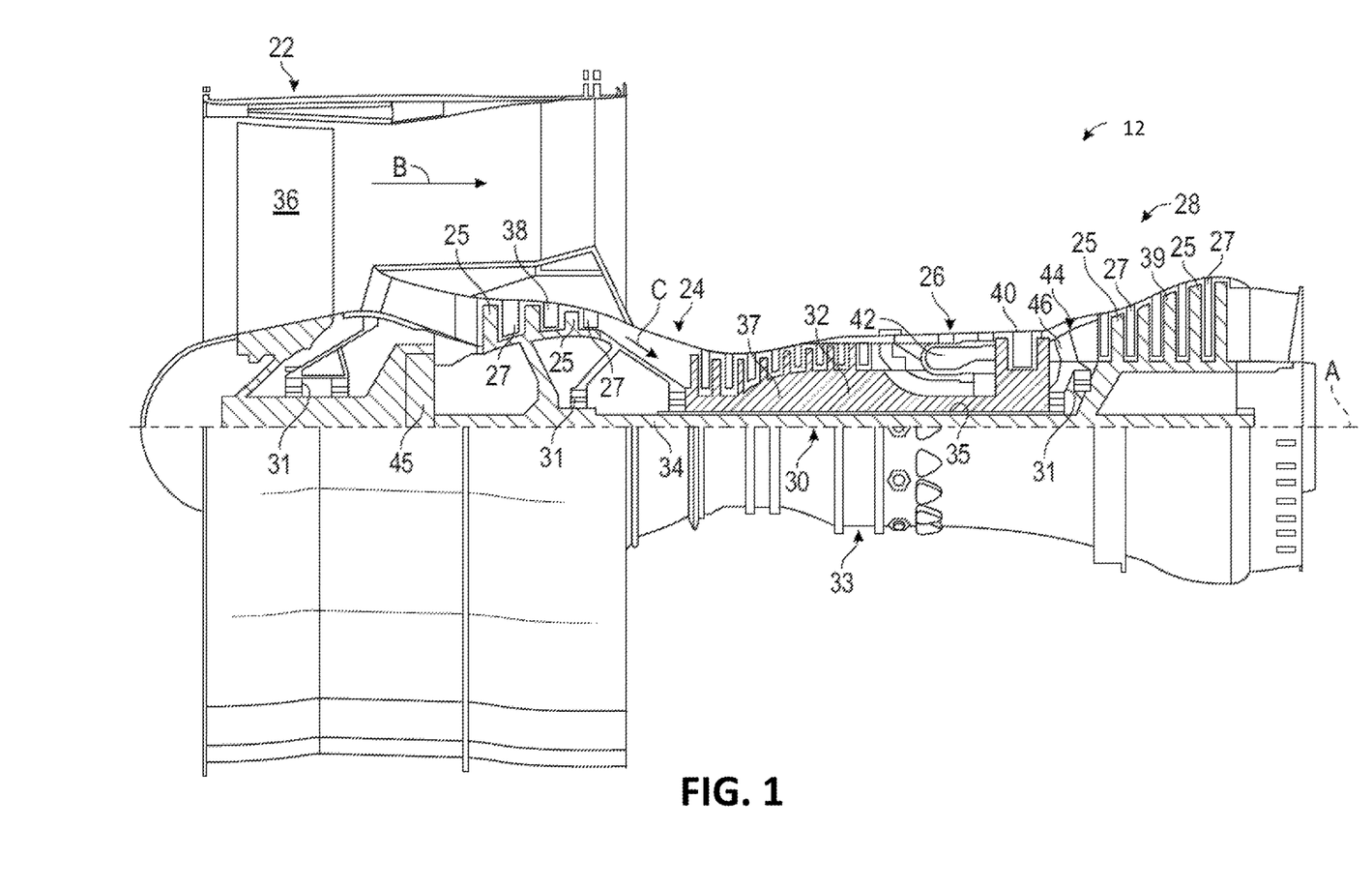
FIG. 1 is a schematic cross-sectional illustration of a gas turbine engine that may employ various embodiments disclosed herein.

For example, turning now to FIG. 1, a schematic cross-sectional view of a gas turbine engine 12 that can also be called a fuel burning engine is shown in accordance with one or more exemplary embodiments.

Specifically, FIG. 1 schematically illustrates a gas turbine engine 12 that is a two-spool turbofan engine that generally incorporates a fan section 22, a compressor section 24, a combustor section 26, and a turbine section 28. Alternative engines might include an augmenter section (not shown), a third spool (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 12 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

In this embodiment of the example gas turbine engine 12, a significant amount of thrust is provided by the bypass flow path B due to the high bypass ratio. Each of the compressor section 24 and the turbine section 28 may include alternating rows of rotor assemblies and vane assemblies that carry airfoils that extend into the core flow path C. For example, the rotor assemblies can carry a plurality of rotating blades 25, while each vane assembly can carry a plurality of stator vanes 27 that extend into the core flow path C. The blades 25 of the rotor assemblies create or extract energy (in the form of pressure) from the core airflow that is communicated through the gas turbine engine 12 along the core flow path C. The stator vanes 27 of the vane assemblies direct the core airflow to the blades 25 to either add or extract energy.

Figure 2:
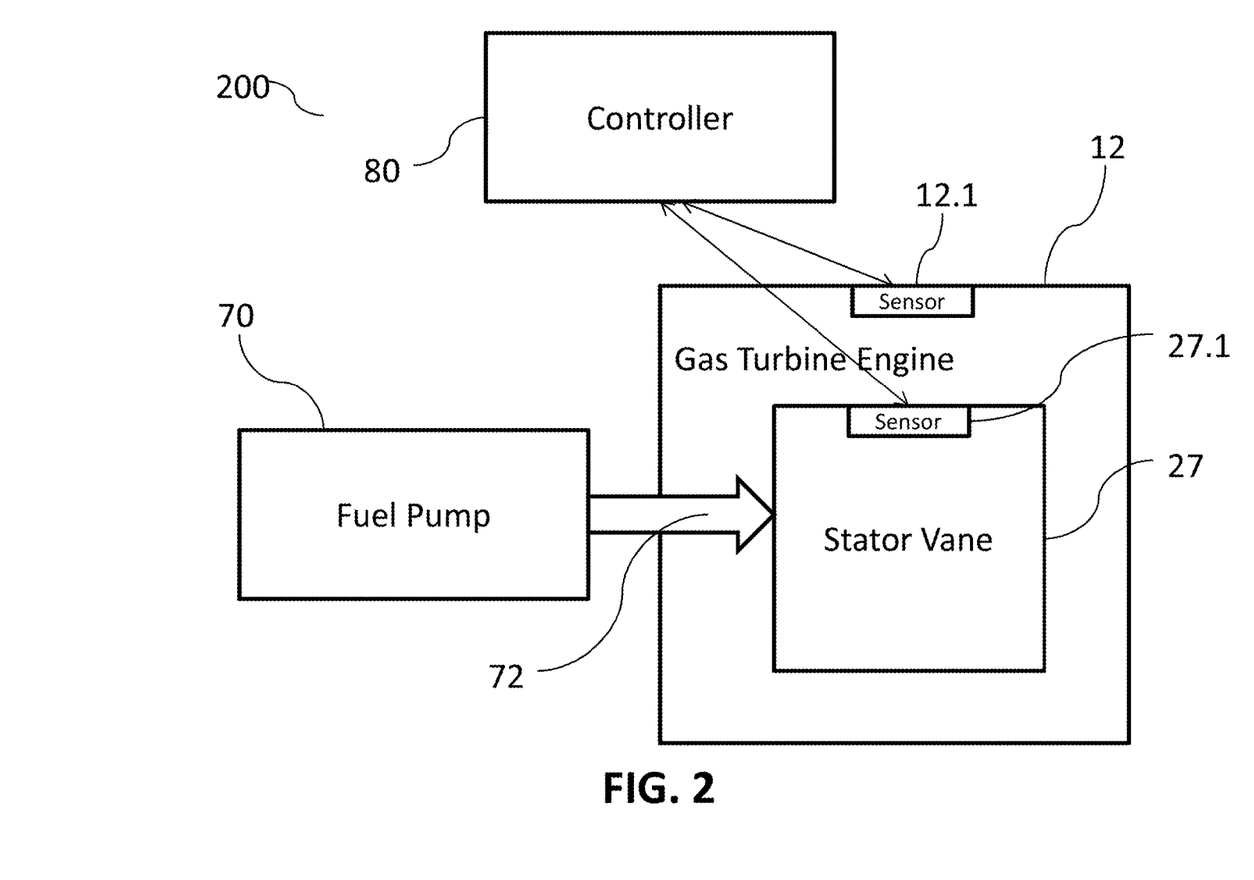
FIG. 2 is a block diagram schematic of an aircraft propulsion system that may employ various embodiments disclosed herein.

Accordingly, the gas turbine engine 12 is part of an aircraft propulsion system 200 (FIG. 2) that further includes a fuel pump 70 that provides fuel to a number of different components of the gas turbine engine 12 as well as a controller 80 for collecting data from various points and/or elements of the gas turbine engine 12 as well as providing control signals as shown in FIG. 2. As noted above, during a starting period different values can be tracked and used to calculate the remaining useful life of at least the fuel pump 70.

Specifically, FIG. 2 is a block diagram schematic of an aircraft propulsion system 200 according to an embodiment. The aircraft propulsion system 200 includes, at least a gas turbine engine 12 that can also be called a fuel burning engine, as shown in FIG. 1, as well as a fuel pump 70 that provides fuel to the gas turbine engine 12 based on control signals received from a controller 80. Further the aircraft propulsion system 200 includes a plurality of sensors 12.1, and 27.1 A gas turbine sensor 12.1 can also be provided that provides the controller with specific information about the gas turbine engine 12 such as the fuel pump speed of the engine as it starts up. Further, the aircraft propulsion system 200 can also include a stator vane sensor 27.1 that provides information about the stator vane 27 such as the stator vane 27 position. Therefore one or more embodiments assess fuel pump performance by tracking the performance of a second apparatus, for example an actuator, which is dependent upon the fuel pump for its performance According to other embodiments, because the actuator's performance can also degrade independent of the fuel pump an additional provision is that the actuator be monitored during normal engine operation so that its health can be reasonably assured to be within normal limits during engine starting.

Using the stator vane actuator as an example, when the engine 12 is completely off, the stator vane sensor 27.1 can record a stator vane position as full, near full, or open. As the engine is cranked for startup and the fuel pressure is supplied from the pump to the stator vane 27 the position will rapidly decrease to the starting commanded position and this generally occurs at a constant value of starter fuel pump speed. Further, as the fuel pump wears, the speed at which the stator vanes reach the commanded position will decrease and in extreme cases can result in the engine not starting. According to one or more embodiments, the fuel pump acts as a hydraulic pump for purpose of the stator vane actuator. According to other embodiments, the fuel pump provides fuel to engine portions that use the fuel to operate to power the state vane actuator. Accordingly, the fuel pump speed and the stator vane position are correlated and can be analyzed to calculate a useful life expectancy of the fuel pump. For example, one or more embodiments can "track" the starter fuel pump speed at which the actuator reaches its commanded value over many start cycles. According to other embodiments, these values of the stator vane position can be completely different for different engines. Regardless of the starting values of the stator vane position, a delta change of the values over time may indicate system wear, specifically, fuel pump 70 wear.

Figure 3:
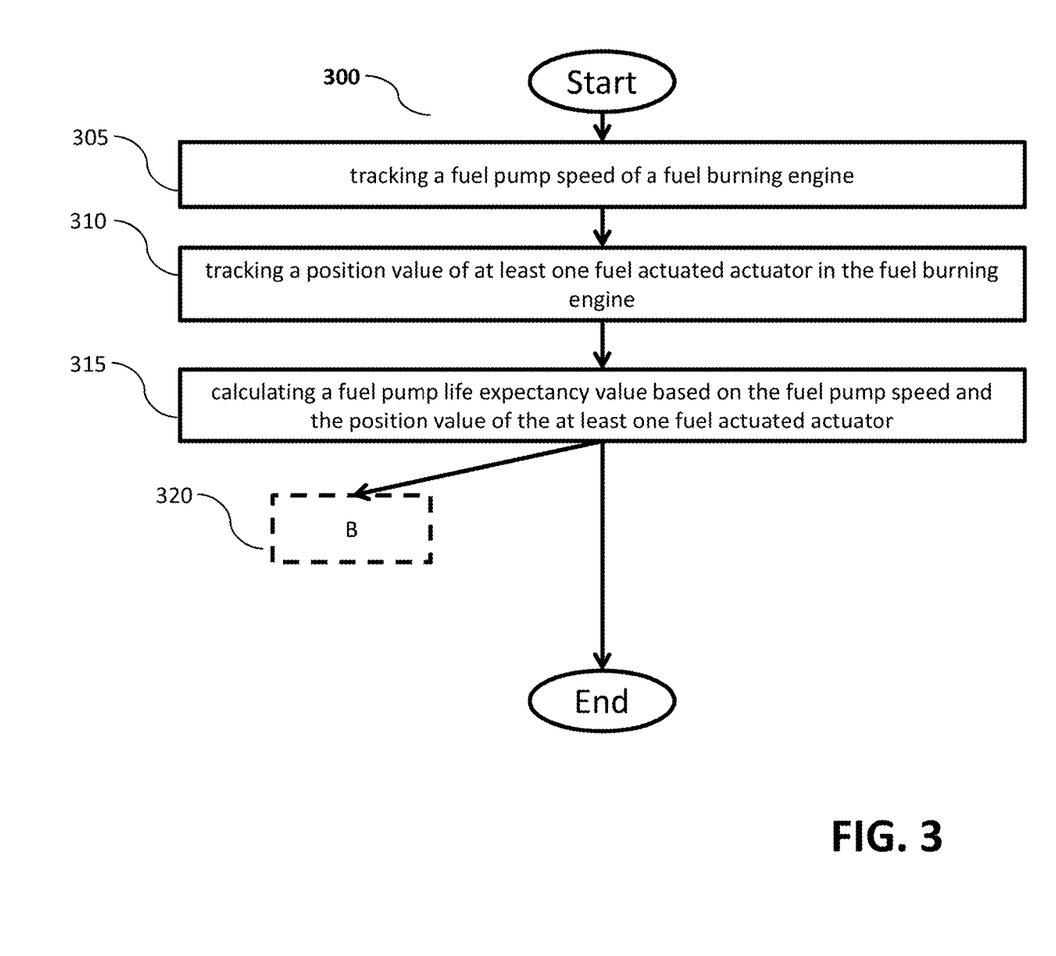
FIG. 3 is a flow chart of a method for determining the useful life of a fuel pump based on collected data in accordance with one or more embodiments of the present disclosure.

FIG. 3 is a flow chart of a method 300 for determining the useful life of a fuel pump based on collected data in accordance with one or more embodiments of the present disclosure. The method 300 includes tracking a fuel pump speed of a fuel burning engine (operation 305). The method 300 further includes tracking a position value of at least one fuel actuated actuator in the fuel burning engine (operation 310). Further, the method 300 includes calculating a fuel pump life expectancy value based on the fuel pump speed and the position value of the at least one fuel actuated actuator (operation 315). According to other embodiments, the method may include other operations as indicated by operation 320 and further discussed below in FIG. 4.

Figure 4:
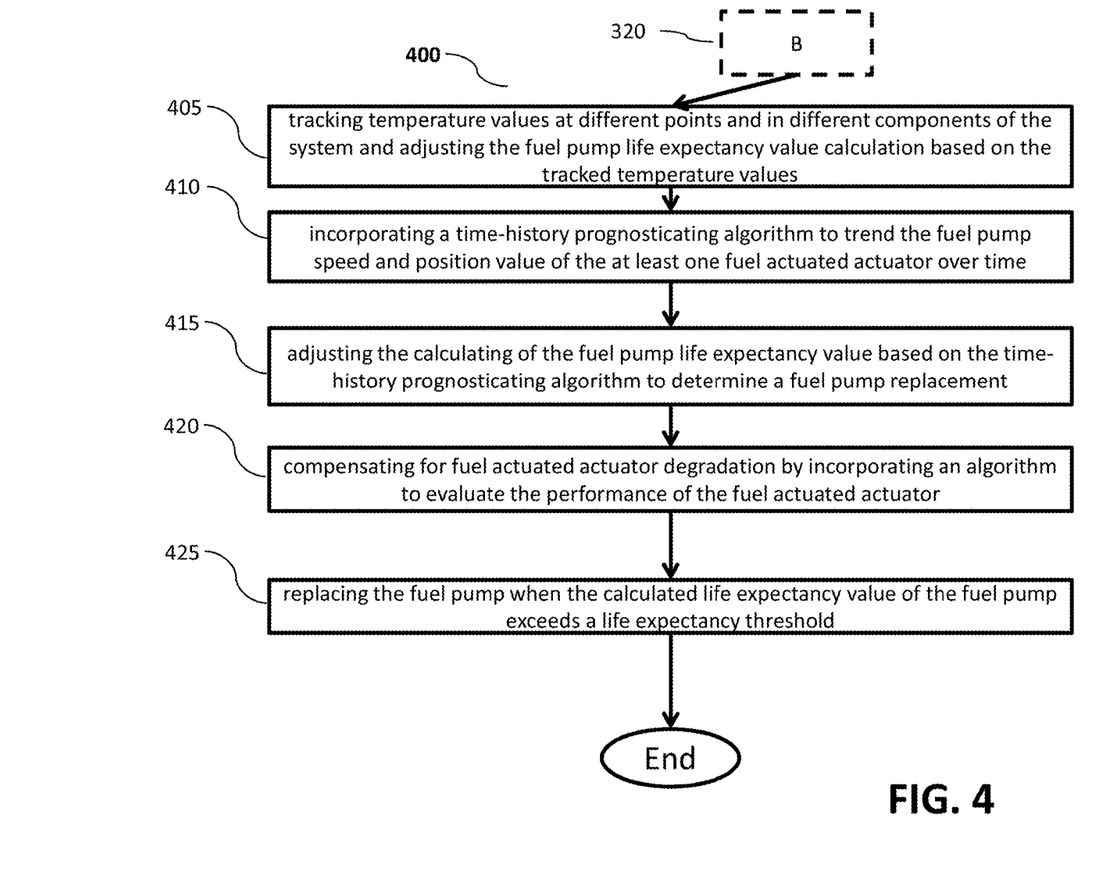
FIG. 4 is a flow chart of a method for determining the useful life of a fuel pump based on collected data in accordance with one or more embodiments of the present disclosure.

FIG. 4 is a flow chart of a method 400 for determining the useful life of a fuel pump based on collected data in accordance with one or more embodiments of the present disclosure. The method 400 further includes tracking temperature values at different points and in different components of the system and adjusting the fuel pump life expectancy value calculation based on the tracked temperature values (operation 405). The method 400 also includes incorporating a time-history prognosticating algorithm to trend the fuel pump speed and position value of the at least one fuel actuated actuator over time (operation 410). Further, the method 400 includes adjusting the calculating of the fuel pump life expectancy value based on the time-history prognosticating algorithm to determine a fuel pump replacement (operation 415). The method 400 also includes compensating for fuel actuated actuator degradation by incorporating an algorithm to evaluate the performance of the fuel actuated actuator (operation 420). Finally, the method 400 can include replacing the fuel pump when the calculated life expectancy value of the fuel pump exceeds a life expectancy threshold (operation 425).

According to one or more other embodiments, in a gas turbine engine the engine starting cycle is initiated with the starter turning the rotating turbomachinery and the fuel pump while the engine control (EEC or FADEC) commands all the fuel actuated effectors to a "start" position. According to an embodiment, fuel supplied by the fuel pump actuates the effector by driving a piston in a cylinder (fueldraulic) actuator. The fuel will not be admitted to the combustion chamber until all fuel actuated effectors (stator vanes) are in the start position. As the fuel pump wears and the capacity at a given speed decreases the speed at which the positioning of the effectors to the starting position during the starting cycle will increase. In order to avoid an ambiguity due to a slow actuator (low slew rate) a separate actuator Built-In-Test (BIT) algorithm can be implemented in the control to flag a slow actuator and the BIT tolerance will be implemented in the software.

Therefore, one or more embodiments disclosed herein record and track this speed along with fuel temperature and trend it over an extended period of time and predict the required maintenance action. It is understood that a plurality of engine starts will have to be accumulated to establish a normalized data base from which an operational performance trend can be determined.

Algorithms to analyze and trend the data form part of this disclosure. Specifically, according to one or more embodiments, after collecting the data from the system as described above, the data is then compared and correlated to each other. And correlated events than coincide with fuel pump deterioration can be detected, recorded, and then tracked for any recurrence or trend toward recurrence that would indicate that the fuel pump is deteriorating. Then once the collected values reach a certain threshold value the fuel pump can be replaced. For example, in accordance with one embodiment, when the stator vane position is at or below 10% and the start speed is near or above 20% the system can determine that based on previously collected data the current fuel pump had reached its threshold usefulness and should be replaced. According to other embodiments, these values can be adjusted based the specifics of the given aircraft, engine, and fuel pump.

Advantageously, one or more of the embodiments described herein provide reduced maintenance cost by not requiring a timed fuel pump replacement, thus replacement can be on-condition as determined by the defined algorithm. Additionally, one or more embodiments described herein provide minimizing the number of engine no-start events resulting in flight delays. Further, one or more of the embodiments described herein provide minimizing engine events from not producing enough power due to poor fuel pump performance While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

The invention claimed is:

1. A method of calculating a fuel pump life expectancy in a fuel burning engine, the method comprising:
   outputting fuel using a fuel pump operating at a fuel pump speed;
   tracking the fuel pump speed of the fuel burning engine;
   adjusting a position of the at least one fuel actuated actuator according to a baseline point of the fuel pump speed so as to reach a valve opening position within a valve adjustment time period;
   tracking a position value indicating the position of at the least one fuel actuated actuator in the fuel burning engine;
   delivering the fuel, via at least one fuel actuated actuator, to the fuel burning engine until the at least one fuel actuated actuator reaches a predetermined position;
   changing the fuel pump speed to a second fuel pump speed as the fuel pump wears, thereby increasing the baseline point of the fuel pump and the valve adjustment time period;
   calculating a fuel pump life expectancy value based on the fuel pump speed, the change in the valve adjustment time period, and the position value of the at least one fuel actuated actuator;

detecting when the fuel pump exceeds the fuel pump life expectancy in response to at least one of the baseline point and the valve adjustment time period exceeding a threshold value; and replacing the fuel pump in response to the fuel pump exceeding the fuel pump life expectancy.

2. The method of claim 1, wherein the fuel actuated actuator is a stator vane.

3. The method of claim 2, wherein tracking the position value includes tracking a stator vane opening percentage.

4. The method of claim 3, wherein calculating the fuel pump life expectancy comprises: determining a stator position point when the position value of the stator vane reaches a stator vane threshold position value during a fuel burning engine starting cycle.

5. The method of claim 1, wherein calculating the fuel pump life expectancy comprises:
detecting when the fuel pump speed reaches a speed threshold value.

6. The method of claim 1, further comprising:
tracking temperature values at different points and in different components of the system; and
adjusting the calculating of the fuel pump life expectancy value based on the tracked temperature values.

7. The method of claim 1, further comprising:
incorporating a time-history prognosticating algorithm to trend the fuel pump speed and position value of the at least one fuel actuated actuator over time; and
adjusting the calculating of the fuel pump life expectancy value based on the time-history prognosticating algorithm to determine a fuel pump replacement.

8. The method of claim 1, wherein tracking one or more of the following are inversely related to the fuel pump life expectancy: an increase in time it takes the fuel actuated actuator to reach an open position; an increase in time it takes for the fuel pump speed to reach a threshold; and an increase in time when the fuel starts flowing.

9. The method of claim 1, further comprising:
compensating for fuel actuated actuator degradation by incorporating an algorithm to evaluate the performance of the fuel actuated actuator.

10. A computer program product for calculating a fuel pump life expectancy in a fuel burning engine, the computer program product comprising a non-transitory computer readable storage medium having program instructions embodied therewith, the program instructions executable by a processor to cause the processor to:
output fuel using a fuel pump operating at a fuel pump speed;
track a fuel pump speed of the fuel burning engine;
track a position value of at least one fuel actuated actuator in the fuel burning engine;
adjust a position of the at least one fuel actuated actuator according to a baseline point of the fuel pump speed so as to reach a valve opening position within a valve adjustment time period;
deliver the fuel, via at least one fuel actuated actuator, to the fuel burning engine when the at least one fuel actuated actuator reaches the open position;
change the fuel pump speed to a second fuel pump speed as the fuel pump wears, thereby increasing the baseline point of the fuel pump and the valve adjustment time period;
calculate a fuel pump life expectancy value based on the fuel pump speed, the change in the valve adjustment time period, and the position value of the at least one fuel actuated actuator;

detect when the fuel pump exceeds the fuel pump life expectancy in response to at least one of the baseline point and the valve adjustment time period exceeding a threshold value; and replace the fuel pump in response to the fuel pump exceeding the fuel pump life expectancy.

11. The computer program product of claim 10, having additional program instructions embodied therewith, the additional program instructions executable by a processor to cause the processor to:
track a stator vane opening percentage, wherein the fuel actuated actuator is the stator vane.

12. The computer program product of claim 10, having additional program instructions embodied therewith, the additional program instructions executable by a processor to cause the processor to:
determine a stator position point when the position value of a stator vane reaches a stator vane threshold position value during a fuel burning engine starting cycle, wherein the fuel actuated actuator is the stator vane; and
detect when the fuel pump speed reaches a speed threshold value.

13. The computer program product of claim 10, having additional program instructions embodied therewith, the additional program instructions executable by a processor to cause the processor to:
track temperature values at different points and in different components of the system; and
adjust the calculating of the fuel pump life expectancy value based on the tracked temperature values.

14. The computer program product of claim 10, having additional program instructions embodied therewith, the additional program instructions executable by a processor to cause the processor to:
incorporate a time-history prognosticating algorithm to trend the fuel pump speed and position value of the at least one fuel actuated actuator over time; and
adjust the calculating of the fuel pump life expectancy value based on the time-history prognosticating algorithm to determine when a fuel pump replacement is required.

15. The computer program product of claim 10, wherein tracking one or more of the following are inversely related to the fuel pump life expectancy: an increase in time it takes the fuel actuated actuator to reach an open position; an increase in time it takes for the fuel pump speed to reach a threshold; and an increase in time when the fuel starts flowing.

16. A system for determining a fuel pump life expectancy, the system comprising:
a fuel actuated actuator, wherein a fuel pump speed of the fuel burning engine is tracked and a position value of the fuel actuated actuator is tracked;
a fuel pump configured to provide fuel to the fuel burning engine; and
a controller configured to receive the fuel pump speed and the position value of the fuel actuated actuator and configured to calculate a fuel pump life expectancy value based on the fuel pump speed and the position value of the at least one fuel actuated actuator.

17. The system of claim 16,
wherein the fuel actuated actuator is a stator vane, and wherein tracking the position value includes tracking a stator vane opening percentage.

18. The system of claim 17, further comprising:
a time-history prognosticating algorithm configured to trend the fuel pump speed and position value of the at least one fuel actuated actuator over time, wherein calculating the fuel pump life expectancy value is adjusting based on the time-history prognosticating algorithm to determine a fuel pump replacement.

\* \* \* \* \*